Patented Sept. 7, 1937

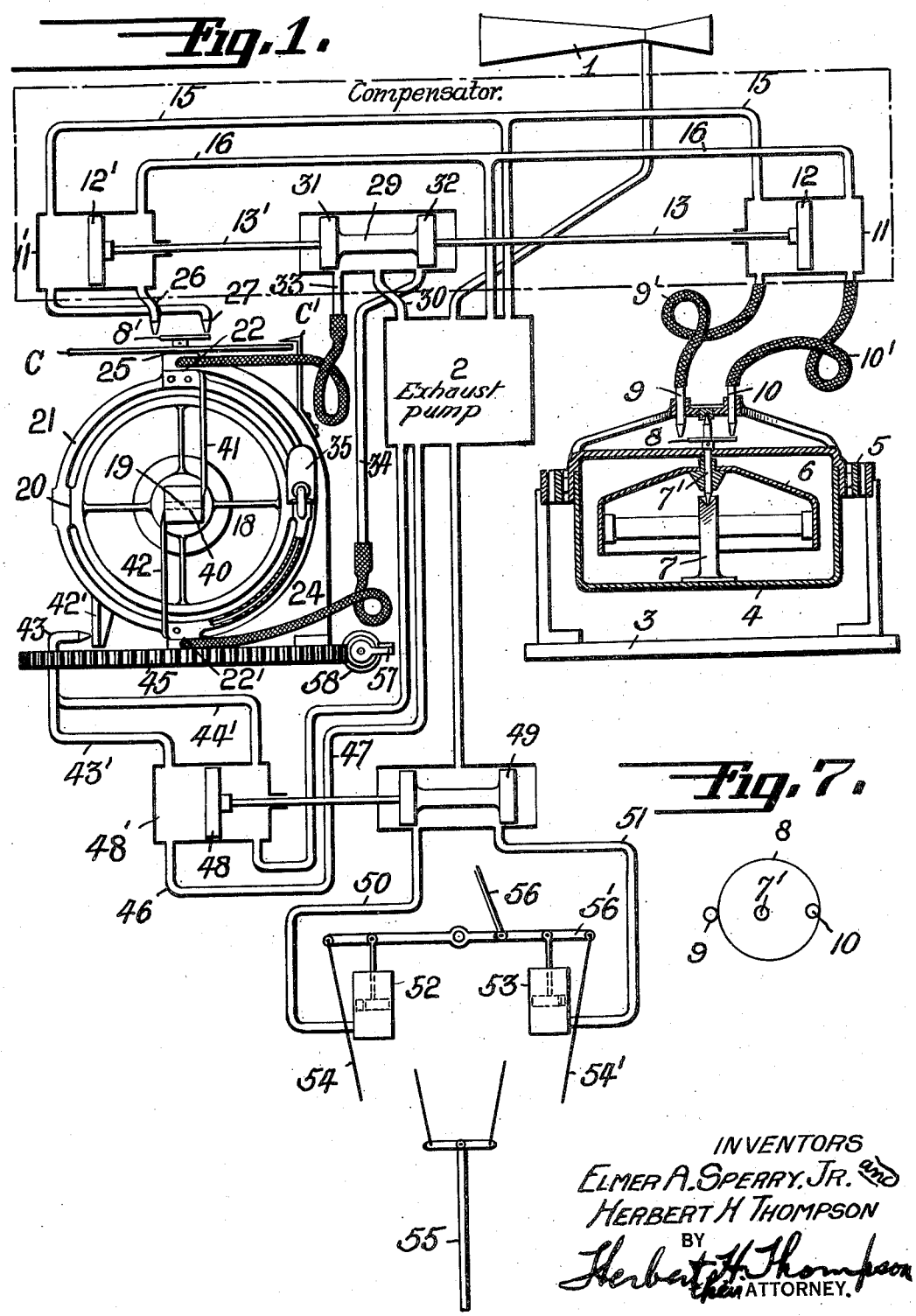

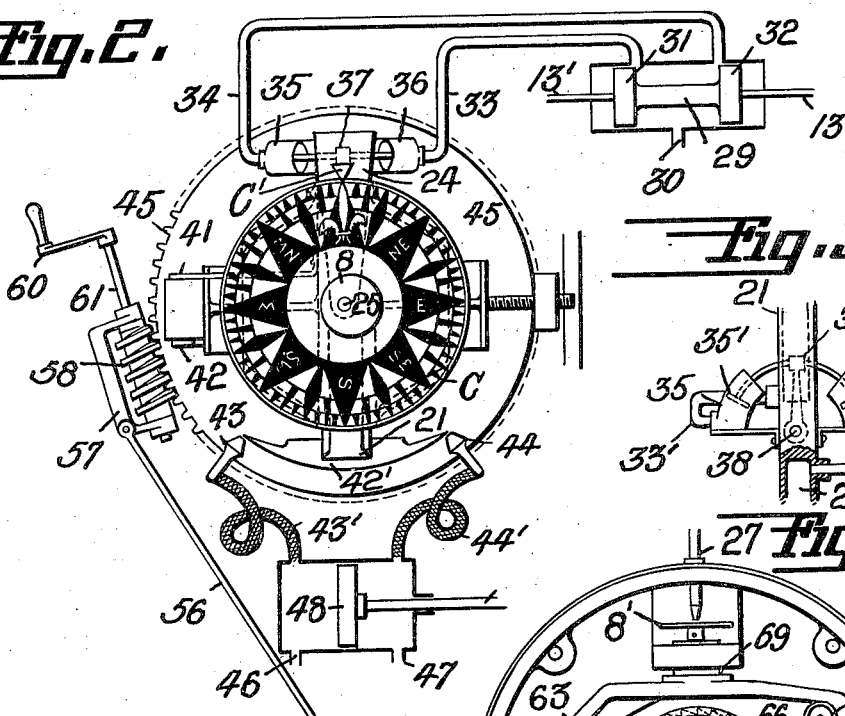

2,092,032

UNITED STATES PATENT OFFICE 2,092,032

GYRO-MAGNETIC COMPASS

Elmer A. Sperry, Jr., Brooklyn, N. Y., and Herbert H. Thompson, Mountain Lakes, N. J., assignors to Sperry Gyroscope Company, Inc., Brooklyn, N. Y., a corporation of New York Application May 7, 1930, Serial No. 450,366
Renewed February 24, 1934

18 Claims. (Cl. 33—204)

This invention relates to direction indicators for moving craft and especially for aircraft. While our invention may be used solely as an indicator of direction, it is also well adapted to furnish a baseline for the automatic steering of aircraft, as to which the present invention constitutes an improvement upon the prior application, now Patent No. 1,982,702 of Elmer A. Sperry, Jr., one of joint applicants, for Gyro pilots for aircraft, dated December 4, 1934. According to our present invention, some form of magnetic compass is used to correct the position of a free gyroscopic indicator when prolonged variation in the relative position of the two indicators occurs. The gyroscope may or may not be located at a distance from the magnetic compass, but by separating the two indicators, the magnetic compass may be placed in the best position in the aircraft away from the engine, while the gyroscopic indicator may be placed on the instrument panel.

While in the aforesaid prior application a gyro magnetic device was adapted for automatic steering, the gyroscope was not an intimate connection or meridian indicator, but in the present device the gyroscope may be used to indicate the meridian as well as to furnish a baseline for automatic steering if desired. This result is accomplished by having an intimate connection or two-way linkage between the magnetic and gyroscopic devices so that whenever there is relative movement in azimuth of the magnetic and gyroscopic devices a corrective torque is applied to the gyroscope to bring it into the same position of azimuth as the magnetic compass. Preferably said torque is so proportioned as to produce a rate of movement of the gyro in azimuth much slower than the rate of turn of the magnetic compass in its natural period, so that the gyroscope does not respond to the temporary oscillations or deviations of the magnetic compass but maintains the true magnetic meridian with the fixity characteristic of free gyroscopes. As the connecting link between the magnetic compass and the gyroscope, we prefer to employ a differential air pressure system, which is simple and inexpensive and which does not disturb the position of either the gyroscope or magnetic compass.

Referring to the drawings in which several preferred forms of the invention are shown, Fig. 1 is a diagrammatic view, partly in section, illustrating a magnetic-gyroscopic direction indicator as used for automatic steering, the gyroscope being shown in elevation and the magnetic compass in vertical section.

Fig. 2 is a plan view of the gyroscope.

Fig. 3 is a detailed side view of the air pressure torque-applying device on the gyroscope.

Fig. 4 is a detail section of the vertical bearing.

Fig. 5 is a vertical section of a modified form of the device designed for use solely as a compass.

Fig. 6 is a vertical section taken at right angles to Fig. 5 of the same instrument.

Fig. 7 is a detailed view of the air disc and nozzles of Fig. 1.

The medium which we prefer to use for interconnecting the magnetic and gyroscopic devices is air pressure, although obviously other sources of power may be employed. The air pressure may be either positive or negative, and we illustrate in Fig. 1 a negative air pressure system in which air is continuously abstracted from the system to create a negative pressure by means of one or more Venturi tubes. Such a tube 1 is shown as connected to an equalizing tank 2 from which pipes lead to the various valves and power pistons of the system. Any suitable form of magnetic compass may be used. As shown, the magnetic compass casing 4 is provided with a gimbal mounting 5 on base 3 and within the casing the usual magnetic element or rose 6 is rotatably mounted in the usual manner on the jeweled post 7, the casing as a whole being preferably stabilized in its gimbals. To the stem 7', supporting the rose, we secure a member 8 which serves to differentially cover and uncover the ends of the nozzles 9 and 10 positioned adjacent thereto. Preferably said member 8 is in the form of a circular disc positioned eccentrically on the stem 8 so that when the nozzles and disc are relatively turned more of the area of one nozzle is uncovered and more of the area of the other nozzle is covered, which creates a differential air flow through the nozzles. If the vacuum system is used, this results in the pressure falling in the pipe connected to the nozzle 10, for instance, as it is covered, while the pressure rises in the nozzle 9 as it is uncovered and the atmospheric air is given freer access thereto. The nozzles are connected through flexible pipes 9' and 10' or other universal connection to opposite ends of a differential power device, such as cylinder 11.

There is also connected to opposite ends of the cylinder 11 restricted exhaust pipes 15 and 16, each of which is connected to the tank 2 so that air is continuously being drawn at a moderate rate from each side of cylinder 11 and hence from each of pipes 9' and 10' and nozzles 9 and 10. As long as the pressures in the two pipes 9' and 10' are equal, i. e., as long as the two nozzles are equally covered, the piston 12 in the cylinder therein will remain stationary, but as the pressure increases in one pipe 9', for instance, the piston 12 will be moved to the right in Fig. 1 and, of course, the reverse movement would take place if the pressure in the pipe 10' became predominant, assuming for the moment that no other devices were connected to the piston rod 13.

The gyroscope is preferably of the free or three-degree of freedom type, usually employed as course indicators. The rotor in Fig. 1 is enclosed within a casing 18 for spinning about a horizontal spinning axis 19 within the casing. The rotor may be spun by any suitable means such as electric motor, or as illustrated in detail in Figs. 5 and 6, by the same source of air pressure as supplies the power source for the other parts of the apparatus. Casing 18 is journaled for oscillation about horizontal axis 20—20 in the vertical ring 21, which in turn is journalled for free turning about the vertical axis 22 in frame 24. A compass card C is shown secured to stem 25 of the vertical ring 21, readable on index C'.

Like the magnetic compass the vertical ring of the gyroscope has connected thereto through the stem 25 a disc 8' which may be similar in all respects to the disc 8 on the magnetic compass. There is provided adjacent disc 8' a pair of nozzles 26—27 similar to the nozzles 9 and 10 and connected similarly to the opposite ends of cylinder 11', which in turn is connected through pipes 15—16 to the tank 2. The said cylinders 11 and 11' and their pistons, together with certain other apparatus described below, constitute a compensating or differential balancing means between the magnetic compass and gyroscope by which the position of the gyroscope is corrected whenever the relative position of the two permanently changes in azimuth. A simple form of compensating device may be secured by connecting the piston rods 13—13' of the two pistons 12 and 12' to the same slide valve 29 so that the two pistons oppose each other and no movement thereof will take place even when the nozzles 9 and 10 or 26 and 27 are differentially uncovered, unless the two pairs of nozzles are uncovered in a different relationship. This is secured by connecting the pipes 26—27 to the opposite ends of the cylinder 11 from the corresponding pipes 9' and 10'.

Just as soon, however, as the discs 8 and 8' turn with respect to one another, there will be produced a differential pressure on the pistons 12 and 12' resulting in a movement of the intermediate master piston valve 29. The interior of said valve is likewise connected to the tank 2 through a pipe 30 and the two ends 31 and 32 of the valve normally cover to an equal extent the ports connected to the pipes 33 and 34. Said pipes lead to a device for correcting the position of the gyroscope. This is preferably in the form of a torque-applying device for exerting a torque about the horizontal axis of the gyroscope to cause precession of the same about the vertical axis at a slow rate. The pipes are shown as leading respectively to the upper and lower hollow guide bearings 22, 22' which communicate with channels 23' in the vertical ring 21. Said channels are connected in turn to the interior of small curved cylinders 35 and 36 through pipes 33', 34'. The pistons 35' and 36' of said cylinders are connected through a crank arm 37 to the horizontal trunnion 38 of the gyroscope, the cylinders themselves being mounted on a vertical ring 21. The pistons preferably have a loose fit in their cylinders so as to allow a limited leakage, or a small bleeder hole may be provided for this purpose. As soon, therefore, as the valve 29 is displaced from its central position, a greater pressure will be exerted in one cylinder than the other due to the retardation of the exhaust and the entrance of atmospheric pressure, thereby applying a torque on the gyroscope. This torque will cease, however, as soon as the discs 8—8' are brought into the same relationship in azimuth.

Our gyro magnetic compass, it will be seen, will function independently of the position of the craft in azimuth, since if the plane should turn the discs 8 and 8' would (apparently) be turned through the same angle so that no torque would be applied on the gyroscope. In said prior application of one of joint applicants on the other hand the gyroscope is not a true compass and will not follow the magnetic compass except when the complete automatic steering device is operating and the course is not changed.

For preventing the gyroscope becoming inclined, we may also employ an air torque device. As shown, air from the case emerges from each end of the aperture 40, the ends of which are differentially covered and uncovered by curved arms 41—42 as the gyro becomes inclined.

In case the apparatus is used for automatic steering, we provide the vertical ring with a member 42' for cooperating with air nozzles 43 and 44 positioned on the rotatable base 45. Said member 42 is shown as a sector, the ends of which partially cover the ends of the nozzles 43—44 when the gyroscope and nozzles are in the normal position (Fig. 2). If, however, the airplane should turn, the nozzles will be displaced, resulting in the more complete covering of one nozzle and more complete uncovering of the other. This will disturb the balance of pressure in the two pipes 43'—44' connected to the cylinder 48', the ends of which are, like cylinder 11, connected to the tank 2 through pipes 46, 47. This will move the piston 48 and the connected slide valve 49 which disturbs the balance in the pipes 50—51 connected to ports in the slide valve. Side pipes are connected to the opposite sides of a servo motor shown as a pair of opposed cylinders 52—53, the pistons being connected through rudder bar 56', wires or other means 54—54' to the rudder 55. Both a follow-up means and means for changing the course are preferably provided, preferably through a differential mechanism.

For changing the course, we have shown a hand crank 60 connected to the shaft 61 of an irreversible worm 58 which meshes with worm wheel 45 at the base of the gyroscope so that by turning the crank the position of the base with respect to the gyro may be turned and hence the course changed through the gyroscope. The follow-up may be provided by a rod 56 connecting the frame 57 of worm 58 to the rudder bar. When the rudder is turned, therefore, the base will be revolved by the axial displacement of the worm.

In Figs. 5 and 6 we show a simple form of gyroscope especially adapted for use as a compass. In this form the gyroscope also is air driven and may be driven from the same source of negative air pressure, i. e., the vacuum tank 2 which supplies the source of power for operating the various controls. For this purpose the gyroscope is entirely enclosed within a shell or casing 80 from which the air is continuously exhausted through a pipe 81. The compass card 62 is shown as in the form of a graduated ring, secured to the vertical ring 63 and visible through the front window 64. Within the vertical ring, the rotor casing or ring 65 is pivoted on horizontal trunnions 20' and the gyro rotor journalled for spinning about a horizontal axis in said ring on bearings 19'. The gyro rotor is provided with buckets or vanes 66 against which air is directed from one or more nozzles 67 in a hollow arm 68 mounted on the base of the vertical ring. The vertical ring is journalled at top and bottom in anti-friction bearings 69—69', the lower bearing being hollow and communicating with the interior of the arm 68. As the air is exhausted through the tube 81, therefore, atmospheric air will flow in through the hollow bearing 69' and up through arm 68 and out through the nozzles 67 to drive the wheel.

The vertical ring is again provided with a disc 8' as in the other form of the invention, and similar nozzles 26—67 are provided immediately above the same. In this instance, however, it is unnecessary to connect the nozzles to a separate source of negative air pressure since the interior of the casing 80 is already connected to negative pressure so that air will be continuously drawn in through the nozzles 26—27 as well as through the driving nozzles 67. It will be understood that the nozzles 26—27 are much smaller in diameter than the driving nozzles so that the air admitted thereby is relatively small. Nozzles are connected as before to a cylinder 11' and in this instance the opposite ends of the cylinder are connected to an equalizing chamber 70 provided with a bleeder hole 71. When the nozzles are equally covered, therefore, the pressure on the two sides of the piston will be equal, but when one nozzle is covered more than the other less air will be drawn out through that nozzle than the other, resulting in differential air pressure to move the piston as before. The torque-applying device in this form of the invention may constitute, as before, a pair of opposed cylinders 35' which are actuated from a master valve (not shown) corresponding to the master valve 29 in the other form of the invention, the direction of air flow being reversed, as in the case of nozzles 26, 27, owing to the piston being within the evacuated casing 80.

From the foregoing, the operation of our magnetic-gyro compass will be readily apparent. In the normal positions the gyroscope and magnetic compass are both pointing north, and the connecting linkages (air pressures) are balanced. If for any reason, due to a yaw or roll of the ship, temporary oscillations of the magnetic compass are set up, the gyroscope will not be disturbed because the rate of precession thereof is so slow that no appreciable precession will take place before the torque is reversed so that the gyroscope remains on the meridian. In case, however, that the gyroscope wanders away from the meridian, unbalanced air pressures will be set up, as explained, on the pistons 11—11' resulting in the movement of the slide valve 29 to exert an unbalanced torque on the gyro and cause a precession of the same back to the meridian. It should be observed that the torques are roughly proportional to the deviation, and cease as the gyro reaches the magnetic meridian. The gyroscope, however, is not subject to the errors and deviations of the true gyroscopic compass, since the gyroscope is perfectly balanced and there is no pendulous factor on which acceleration forces may act.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. A gyro-magnetic directional indicator comprising a normally free gyroscope, means for exerting a corrective torque about the horizontal axis thereof, a magnetic compass, and differential means controlled by relative change in indicating positions of said compass and gyroscope for controlling said torque means to correct the position of the gyroscope.

2. A gyro-magnetic directional indicator comprising a normally free gyroscope, air pressure means for exerting a corrective torque thereon, a magnetic compass, and differential air flow means controlled by relative change in indicating positions of said compass and gyroscope for controlling said torque means to correct the position of the gyroscope.

3. A steering indicator for air and other craft comprising a magnetic compass rose, a pair of air nozzles located adjacent thereto, a member on said rose adapted to differentially cover and uncover said nozzles as the rose turns with respect thereto, and a remotely located direction indicator controlled from said rose including a normally free gyroscope and air pressure means for controlling the position thereof controlled from the pressure at said nozzles.

4. A gyro-magnetic directional indicator comprising a normally free gyroscope, a magnetic compass, means responsive to the position of said compass, means responsive to the position of said gyroscope, a compensator governed differentially by said two means, and power means controlled by said compensator for synchronizing the readings of said gyroscope with said magnetic compass.

5. A gyro-magnetic directional indicator comprising a normally free gyroscope, a magnetic compass, air pressure means responsive to the position of said compass, air pressure means responsive to the position of said gyroscope, a compensator governed differentially by said two means, and air pressure means controlled by said compensator for synchronizing the readings of said gyroscope with said magnetic compass.

6. A meridian indicating indicator for dirigible craft comprising a north seeking instrument, and a normally free gyroscope having inconsequential north seeking properties, air pressure means controlled by the position of said instrument in azimuth, air pressure means controlled by the position of said gyroscope in azimuth, a compensator governed differentially by said two means, and air pressure means controlled by said compensator for applying torques about the horizontal axis of said gyroscope to maintain it in the same azimuthal position as the average position of said instrument.

7. A gyro-magnetic directional indicator comprising a free gyroscope, a torque means for exerting torques in either direction about the horizontal axis of said gyroscope, a magnetic compass, and differential means controlled by relative change in indicating positions of said compass and gyroscope for bringing said means into action to correct the position of the gyroscope.

8. A gyro-magnetic directional device comprising a normally free gyroscope, means for exerting a corrective torque about the horizontal axis thereof, a magnetic compass, and differential means controlled by changes in the relative azimuthal position of said compass and gyroscope from a predetermined relationship for controlling said torque means to correct the azimuthal position of the gyroscope.

9. A gyro-magnetic compass for vehicles comprising a free gyroscope having a compass card thereon, means for exerting a corrective torque thereon, a magnetic compass, and means controlled by a change in the relative indicating directions of said gyroscope and compass for bringing said torque means into action to cause relatively slow precession of said gyroscope in a direction to restore it into alignment with the magnetic compass.

10. A gyro-magnetic directional indicator comprising a normally free gyroscope, differential air flow means for exerting a corrective torque about the horizontal axis thereof, differential air flow means for exerting an erecting torque about the vertical axis thereof, a magnetic compass, differential means controlled by relative change in azimuthal indicating positions of said compass and gyroscope for controlling said corrective torque means to correct the position of the gyroscope, and means brought into action by tilt of said gyroscope for bringing said erecting torque into action.

11. In a gyro magnetic compass, the combination with a directional gyroscope having a gyro rotor support, of a pivotally mounted magnetic compass element, and a source of power rendered effective upon relative azimuthal displacement of said element and gyroscope to cause said gyroscope to follow the average position of said element.

12. A gyro magnetic compass comprising a gyro rotor, a rotor bearing support in which said rotor is journalled on a horizontal spin axis, a vertical ring pivoted on a normally vertical axis and in which said support is journalled about a second horizontal axis normal to said spin axis, a magnetic needle pivotally mounted for movement about a normally vertical axis, and means responsive to relative turning of said needle and support in azimuth for applying a torque on said gyroscope about said second horizontal axis to precess said gyroscope into agreement with said needle.

13. A gyro magnetic compass comprising a gyro rotor, a rotor bearing support in which said rotor is journalled on a horizontal spin axis, an outer ring in which said support is journalled about a second horizontal axis at right angles to said other axis, an outer frame in which said ring is journalled about a third normally vertical axis, a magnetic needle pivoted about a normally vertical axis, means responsive to relative turning of said needle and casing in azimuth for applying a torque on said gyroscope about a horizontal axis to precess said gyroscope into agreement with said needle, and means responsive to tilt of said support about said second horizontal axis for applying a corrective torque about the vertical axis.

14. A gyro magnetic compass comprising a gyroscope operating normally on a horizontal axis, a gyroscope support, a magnetic needle element, torque means controlled by both said magnetic element and gyroscope for maintaining the gyroscope spin axis in fixed azimuth relation to the average position of the magnetic element, and other torque means controlled by tilt of said gyroscopic spin axis for maintaining the same horizontal.

15. A gyro magnetic compass comprising a gyro rotor, a gyroscope support in which said rotor is universally mounted with its spin axis normally horizontal, power means for maintaining the gyroscope spin axis in a normally horizontal position, a pivoted magnetic compass element, and power means actuated from relative turning of said magnetic element and support in azimuth for applying a precessing torque to the gyro rotor to maintain the gyroscope spin axis on the magnetic east-west direction.

16. A gyro-magnetic directional indicator comprising a normally free gyroscope having a normally horizontal spin axis, air pressure means for exerting a corrective torque thereon, a magnetic compass, differential air flow means controlled by relative change in indicating positions of said compass and gyroscope for controlling said torque means to correct the position of the gyroscope, and differential air flow means for maintaining said spin axis horizontal.

17. A gyro-magnetic compass comprising a gyroscope, the rotor of which normally has a horizontal spin axis, a magnetic needle element, a controller the position of which is normally governed by a change in the relative predetermined position in azimuth of said magnetic element and the rotor spin axis, means operated by said controller for maintaining said spin axis in said relation in azimuth to the average position of the magnetic element, a second controller the position of which is governed by the tilt of said spin axis, and means operated thereby for restoring said spin axis to the horizontal.

18. In a pneumatically controlled automatic pilot for aircraft, a free gyroscope, a magnetic compass, a differential air pick-off from each giving pressure differences varying with the relative turning of each with respect to the craft, a relay valve having air chambers in communication with the pick-offs on both instruments, and a piston member therein subject to the difference in effective pressures from said two pick-offs.

ELMER A. SPERRY, Jr.
HERBERT H. THOMPSON.